US012718576B2

(12) United States Patent
Huang et al.

(10) Patent No.: US 12,718,576 B2
(45) Date of Patent: Aug. 25, 2026

(54) SAFETY EVENT DETERMINING SYSTEM AND METHOD THEREOF

(71) Applicant: INDUSTRIAL TECHNOLOGY RESEARCH INSTITUTE, Hsinchu (TW)

(72) Inventors: Jay Huang, Tainan City (TW); Shih-Chun Chang, Tainan City (TW); Yi-Jiun Wang, Kaohsiung City (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 19/176,584

(22) Filed: Apr. 11, 2025

(65) Prior Publication Data

US 2026/0179385 A1 Jun. 25, 2026

(30) Foreign Application Priority Data

Dec. 19, 2024 (TW) ................................ 113149663

(51) Int. Cl.
*G06V 20/52* (2022.01)
*G06T 5/50* (2006.01)
(Continued)

(52) U.S. Cl.
CPC ................ *G06V 20/52* (2022.01); *G06T 5/50* (2013.01); *G06T 7/70* (2017.01); *G06V 10/761* (2022.01);
(Continued)

(58) Field of Classification Search
CPC ...... G06V 20/52; G06V 20/44; G06T 10/751; G06T 5/50; G06T 7/70; G06T 2007/20221; G06T 2007/10048
See application file for complete search history.

(56) References Cited

U.S. PATENT DOCUMENTS 9,691,253 B2 * 6/2017 Russell ................ A61B 5/1117
9,824,570 B1 11/2017 Skowronek et al.
(Continued)

FOREIGN PATENT DOCUMENTS

AU 2018327869 B2 9/2023
CN 105425937 A 3/2016
(Continued)

OTHER PUBLICATIONS

Kong et al., "Fall Detection for Elderly Persons Using a Depth Camera", Proceedings of the 2017 International Conference on Advanced Mechatronic Systems, Xiamen, China, Dec. 6-9, 2017, 5 pages.
(Continued)

*Primary Examiner* — Brian P Yenke
(74) *Attorney, Agent, or Firm* — Birch, Stewart, Kolasch & Birch, LLP

(57) ABSTRACT

A safety event determining system, comprises the following components. A first recognizing device is configured to recognize a posture of a target object according to a first image to generate a first recognizing result, which is associated with a first confidence. The second recognizing device, recognizes the posture of the target object according to a second image to generate a second recognizing result, which is associated with the second confidence. The second image is heterogeneous from the first image. A first processor, overlays the first image and the second image to generate a superimposed image, and performs a matching operation according to the first recognition result, the second recognition result and the superimposed image to obtain a plurality of matching results. A second processor, analyzes each matching result to obtain a posture category result and a safety event determination result.

20 Claims, 8 Drawing Sheets

(51) Int. Cl.
*G06T 7/70* (2017.01)
*G06V 10/74* (2022.01)
*G06V 20/40* (2022.01)

(52) U.S. Cl.
CPC .... *G06V 20/44* (2022.01); *G06T 2207/10048* (2013.01); *G06T 2207/20221* (2013.01)

(56) References Cited

U.S. PATENT DOCUMENTS 10,080,513 B2 9/2018 Stone et al.
10,231,647 B2 3/2019 Kostic et al.
10,423,848 B2 * 9/2019 Syu .......................... G06T 7/194
10,489,661 B1 * 11/2019 Rush ...................... G06V 40/20
10,674,139 B2 6/2020 Javidi et al.
11,158,123 B2 * 10/2021 Chen ......................... G06T 7/75
11,298,049 B2 * 4/2022 Kim ...................... A61B 5/1117
11,328,239 B2 * 5/2022 Baek .................... G06N 3/0464
11,328,571 B2 5/2022 Hanson et al.
11,555,913 B2 * 1/2023 Akiyama ............... G01B 11/02
11,756,288 B2 * 9/2023 Zhang ................ G06V 10/7747
12,149,826 B2 * 11/2024 Jia ............................ G06T 5/73
12,320,670 B2 * 6/2025 Chen ...................... G01C 25/00
12,406,023 B1 * 9/2025 Alvarez Lopez ... G06F 18/2148
12,548,134 B1 * 2/2026 Borghese ............... G06N 20/00
2012/0075464 A1 3/2012 Derenne et al.
2012/0092156 A1 * 4/2012 Tran ..................... A61B 5/0022
340/539.12
2013/0329947 A1 * 12/2013 Wu ...................... G06V 10/255
382/103
2018/0039745 A1 * 2/2018 Chevalier .............. G16H 50/20
2018/0143318 A1 * 5/2018 Skowronek ............. G01S 3/802
2018/0143321 A1 * 5/2018 Skowronek ............. G01S 17/66
2019/0020831 A1 * 1/2019 Hsieh ..................... G06V 10/80
2020/0120290 A1 * 4/2020 Yun ...................... H04N 23/695
2020/0258364 A1 8/2020 Quilici et al.
2022/0101710 A1 3/2022 Tunnell
2022/0319209 A1 * 10/2022 Wu ...................... G06V 40/103
2023/0206481 A1 * 6/2023 Lin .......................... G06T 7/62
382/103
2024/0225558 A1 * 7/2024 Ishikawa .............. A61B 5/7275
2024/0331448 A1 * 10/2024 Qin ......................... G06T 7/521
2024/0350032 A1 * 10/2024 Ostadabbas .......... A61B 5/1128
2024/0354446 A1 * 10/2024 Assouad ................ G16H 40/67

FOREIGN PATENT DOCUMENTS

CN 108960056 B 6/2022
CN 118247843 A 6/2024
JP 7135064 B2 9/2022
TW I425431 B 2/2014
TW I603294 B 10/2017
TW I643092 B 12/2018
TW I682368 B 1/2020
TW I725524 B 4/2021
TW M610371 U 4/2021
TW 202248673 A 12/2022
TW I786478 B 12/2022
TW I792106 B 2/2023
TW I797596 B 4/2023
TW 202321987 A 6/2023

OTHER PUBLICATIONS

Li et al., "A Real-time Fall Detection System Using ToF Depth Images", 2022 IEEE 10th International Conference on Smart City and Informatization (ISCI), 2022, pp. 41-48.

Rezaei et al., "An Unobtrusive Fall Detection System Using Low Resolution Thermal Sensors and Convolutional Neural Networks", 2021 43rd Annual International Conference of the IEEE Engineering in Medicine & Biology Society (EMBC), Oct. 31-Nov. 4, 2021. Virtual Conference, pp. 6949-6952.

* cited by examiner

SAFETY EVENT DETERMINING SYSTEM AND METHOD THEREOF

This application claims the benefit of Taiwan application Serial No. 113149663, filed Dec. 19, 2024, the disclosure of which is incorporated by reference herein in its entirety.

TECHNICAL FIELD

The present disclosure relates to a determining mechanism, and particularly relates to a determining system and a determining method for determining safety events.

BACKGROUND

With the substantial increasing of the elderly population, the home safety of elderly people living alone has become an important issue. Traditional home monitoring systems usually use depth imaging monitoring or thermal imaging monitoring. However, if depth image monitoring is used alone, erroneous determination may occur. For example, it is difficult to distinguish whether the target object in the image is an elderly person or a quilt. Similarly, if thermal imaging monitoring is used alone, erroneous determination may also occur. For example, the target object in the image may be the residual heat of the elderly person.

The above situation often leads to a high possibility for erroneous determination of traditional home monitoring systems. To address this issue, there is a need to provide an improved monitoring system that can have advantages of both depth image monitoring and thermal image monitoring, and can improve accuracy of determining home safety events.

SUMMARY

According to one embodiment of the present disclosure, a safety event determining system is provided. The safety event determining system is for determining whether a target object is safe, and comprises the following elements. A first recognition device, which is for recognizing a posture of the target object according to a first image, so as to generate a first recognition result, wherein the first recognition result is associated with a first confidence. A second recognition device, which is for recognizing the posture of the target object according to a second image, so as to generate a second recognition result, wherein the second recognition result is associated with a second confidence, and the second image is heterogeneous with the first image. A first processor, which is configured to superimpose the first image and the second image to generate a superimposed image, and perform a matching operation according to the first recognition result, the second recognition result and the superimposed image to obtain a matching result set, wherein the matching result set comprises a plurality of matching results. A second processor, which is configured to analyze each of the matching results to obtain a posture category result and a safety event determination result.

According to another embodiment of the present disclosure, a safety event determining method is provided. The safety event determining method is for determining whether a target object is safe, and comprises the following steps. A posture of the target object is recognized according to a first image by a first recognition device, so as to generate a first recognition result, wherein the first recognition result is associated with a first confidence. The posture of the target object is recognized according to a second image by a second recognition device, so as to generate a second recognition result, wherein the second recognition result is associated with a second confidence, and the second image is heterogeneous with the first image. The first image and the second image are superimposed to generate a superimposed image, and a matching operation is performed according to the first recognition result, the second recognition result and the superimposed image to obtain a matching result set, by a first processor, wherein the matching result set comprises a plurality of matching results. Each of the matching results is analyzed to obtain a posture category result and a safety event determination result, by a second processor.

Figure 1:
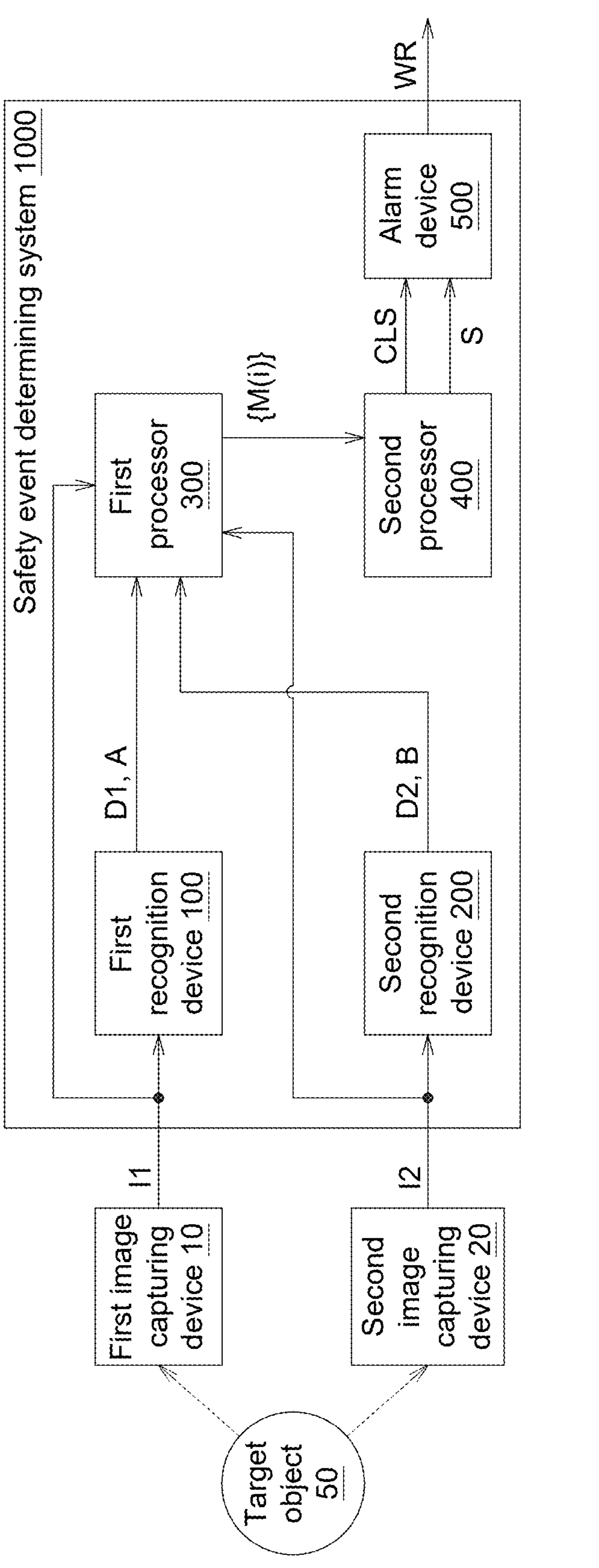
FIG. 1 is a block diagram of a safety event determining system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is a block diagram of a safety event determining system 1000 according to an embodiment of the present disclosure. The safety event determining system 1000 is used to determine a safety event of a target object 50. The target object 50 is, for example, an elderly person at home. In one example, the safety event determining system 1000 is a processor in the form of a hardware circuit, such as a digital signal processor (DSP), a central processing unit (CPU), and a micro control unit (MCU), but is not limited thereto. As shown in FIG. 1, the safety event determining system 1000 comprises a first recognition device 100, a second recognition device 200, a first processor 300, a second processor 400 and an alarm device 500. Furthermore, the above mentioned first recognition device 100, the second recognition device 200, the first processor 300, the second processor 400 and the alarm device 500 are hardware circuit units inside the safety event determining system 1000.

In another example, the safety event determining system 1000 is a software program module, which utilizes software codes inside a central processing unit or a digital signal processor to implement the functions of the safety event determining system 1000. The first recognition device 100, the second recognition device 200, the first processor 300, the second processor 400 and the alarm device 500 inside the safety event determining system 1000 are all software modules, and their respective functions are realized by software codes (the software codes comprise several instructions). The above-mentioned software codes can be stored in a non-transitory computer-readable storage medium. The non-transitory computer-readable storage medium is, for example, various forms of non-transitory (non-volatile) memory, hard disk, USB flash drive and other storage devices. The non-transitory computer-readable storage medium may be electrically connected to the CPU or the DSP, or may be disposed in the CPU or the DSP. The CPU or the DSP reads the software codes from the non-transitory computer-readable storage medium, and executes the instructions of the software codes to implement the functions of the first recognition device 100, the second recognition device 200, the first processor 300, the second processor 400 and the alarm device 500.

The safety event determining system 1000 operates in coordination with first image capturing device 10 and the second image capturing device 20 which are external to the safety event determining system 1000. The first image capturing device 10 captures an image of the target object 50 to generate a first image I1. Similarly, the second image capturing device 20 captures an image of the target object 50 to generate a second image I2. The first image capturing device 10 and the second image capturing device 20 capture the image of the target object 50 according to different mechanisms. In the present embodiment, the first image capturing device 10 is, for example, a time-of-flight (ToF) camera device, which captures images according to the depth coordinate of each part of the target object 50. The first image I1 generated by the first image capturing device 10 is a depth image of the target object 50. On the other hand, the second image capturing device 20 is, for example, an infrared camera device, which captures images according to the temperature of each part of the target object 50. The second image I2 generated by the second image capturing device 20 is an infrared image (also referred to as a "thermal image") of the target object 50. The first image I1 is different from the second image I2 in attributes, that is, the first image I1 is "heterogeneous" to the second image I2.

The first recognition device 100 of the safety event determining system 1000 receives the first image I1 generated by the first image capturing device 10. The first recognition device 100 performs posture recognition using a neural network model (e.g., a "Yolo-v3" model) with an artificial intelligence algorithm, so as to recognize the posture of the target object 50, and thereby generate a first recognition result D1. The first recognition result D1 comprises a first posture category cls_1. The first posture category cls_1 indicates the recognized posture of the target object 50. For example, the first posture category cls_1 indicates that the object 50 is in one of a standing posture, a sitting posture, or a lying posture. Furthermore, the first recognition device 100 evaluates a first confidence A of the first image capturing device 10. The first confidence A indicates that, a degree with which the first image I1 of the first image capturing device 10 can be trusted, and also reflects a recognition accuracy of the first recognition result D1. In one example, the first confidence A may be comprised in the first recognition result D1. The first recognition device 100 transmits the first recognition result D1 and the first confidence A to the first processor 300.

On the other hand, the second recognition device 200 of the safety event determining system 1000 receives the second image I2 generated by the second image capturing device 20. Similar to the operation of the first recognition device 100, the second recognition device 200 also recognizes the posture of the target object 50 by using a neural network model and an artificial intelligence algorithm, so as to generate a second recognition result D2. The second recognition result D2 comprises a second posture category cls_2, which indicates the recognized posture of the target object 50 (e.g., a standing posture, a sitting posture, or a lying posture). Furthermore, the second recognition device 200 evaluates the second confidence B of the second image capturing device 20. The second confidence B indicates a degree with which the second image I2 of the second image capturing device 20 can be trusted, and also reflects the recognition accuracy of the second recognition result D2. In one example, the second confidence B may be comprised in the second recognition result D2. Then, the second recognition device 200 transmits the second recognition result D2 and the second confidence B to the first processor 300.

The first processor 300 receives the first recognition result D1 and the first confidence A from the first recognition device 100, and receives the second recognition result D2 and the second confidence B from the second recognition device 200. In addition, the first processor 300 receives the first image I1 from the first image capturing device 10, and receives the second image I2 from the second image capturing device 20. The first processor 300 performs image superimposing according to the first image I1 and the second image I2. Furthermore, the first processor 300 performs a matching operation according to the first recognition result D1, the second recognition result D2 and the result of image superposing, so as to obtain a plurality of matching results M(i), which are aggregated into a matching result set {M(i)}. Then, the first processor 300 transmits the matching result set {M(i)} to the second processor 400.

The second processor 400 performs analysis and processing according to the matching result set {M(i)}, so as to obtain a posture category result CLS and a safety event determination result S. The second processor 400 analyzes each matching result M(i) of the matching result set {M(i)}, one by one. According to the matching result M(i), the second processor 400 compares the first posture category cls_1 of the first recognition result D1 with the second posture category cls_2 of the second recognition result D2. When the first posture category cls_1 is the same as the second posture category cls_2, the second processor 400 uses the first posture category cls_1 (or the second posture category cls_2) as the posture category result CLS. Furthermore, the second processor 400 determines whether the target object 50 is safe according to the posture category result CLS, and generates the safety event determination result S accordingly. For example, the first posture category cls_1 and the second posture category cls_2 are both "standing posture", and the second processor 400 takes "standing posture" as the posture category result CLS. Since the target object 50 is in a standing posture, it means that the target object 50 does not fall down, and hence the second processor

400 determines that the target object 50 is safe and outputs the safety event determination result S as "safe".

On the other hand, the second processor 400 can also evaluate the first weight WE1 of the first image I1 and the second weight WE2 of the second image I2. When the first posture category cls_1 is different from the second posture category cls_2, the second processor 400 is temporarily unable to determine to take the first posture category cls_1 (or the second posture category cls_2) as the posture category result CLS. Therefore, the second processor 400 determines the posture category result CLS by means of the first weight WE1 and the second weight WE2. For example, the second processor 400 performs calculation according to the first confidence A, the second confidence B, the first weight WE1 and the second weight WE2 to determine whether the first posture category cls_1 or the second posture category cls_2 can be taken as the posture category result CLS.

More specifically, the first weight WE1 is associated with the first image capturing device 10. The first image capturing device 10 measures the target object 50 and captures its image according to the time-of-flight (ToF) mechanism, and the measured value is proportional to the distance of the target object 50. The first image capturing device 10 can provide a more accurate distance measurement. On the other hand, the second weight WE2 is associated with the second image capturing device 20. The second image capturing device 20 forms the images according to the temperature difference, and is capable of detecting the heat of the target object 50 and capturing its thermal image. In an indoor environment, the first weight WE1 may be set to be higher than the second weight WE2. In one example, the first weight WE1 is set to 0.6, and the second weight WE2 is set to 0.4.

In addition, the second processor 400 transmits the posture category result CLS and the safety event determination result S to the alarm device 500. The alarm device 500 can selectively generate an alarm signal WR according to the safety event determination result S. For example, when the safety event determination result S is "safe", the alarm device 500 does not generate the alarm signal WR. On the contrary, when the safety event determination result S is "dangerous", the alarm device 500 generates the alarm signal WR.

Figure 2A:
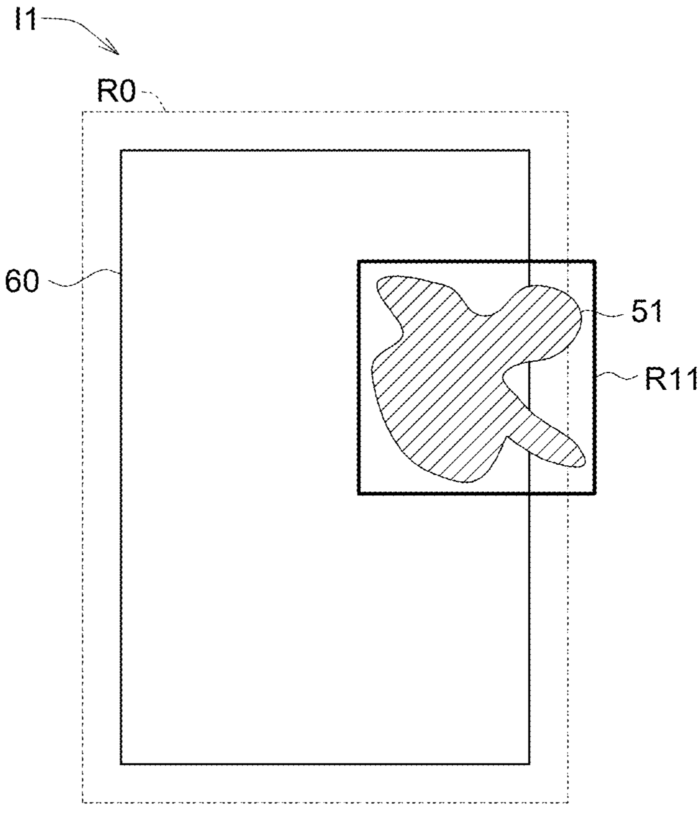
FIG. 2A is a schematic diagram of the first recognition device analyzing the first image I1.

Next, please refer to FIG. 2A, which is a schematic diagram of the first recognition device 100 analyzing the first image I1. The first recognition device 100 recognizes the posture of the target object 50 according to the first image I1, so as to generate a first recognition result D1. More specifically, the first recognition device 100 defines a plurality of regions in the first image I1, including a region R0 and a region R11. The first recognition device 100 takes a bed 60 as a reference object and defines the region R0 according to the bed 60. Furthermore, the first recognition device 100 analyzes the target projection 51 from the first image I1, The target projection 51 is, for example, a sitting posture projection of the target object 50. The first recognition device 100 defines a region R11 according to the target projection 51.

Figure 2B:
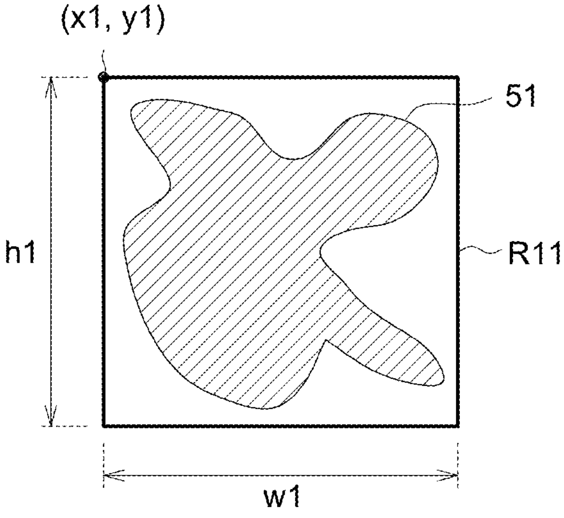
FIG. 2B is a schematic diagram of the region of the first image.

Next, please refer to FIG. 2B, which is a schematic diagram of the region R11 of the first image I1. The first recognition device 100 analyzes the region R11 to obtain a plurality of parameters of the region R11, including the origin coordinate (x1, y1), the height h1, and the width w1 of the region R11. The first recognition result D1 of the first recognition device 100 includes: the above parameters of the region R11, the first confidence A and the first posture category cls_1, as shown in equation (1-1):

$$D1 = [x1, y1, w1, h1, A, \text{cls\_1}] \tag{1-1}$$

Figure 3A:
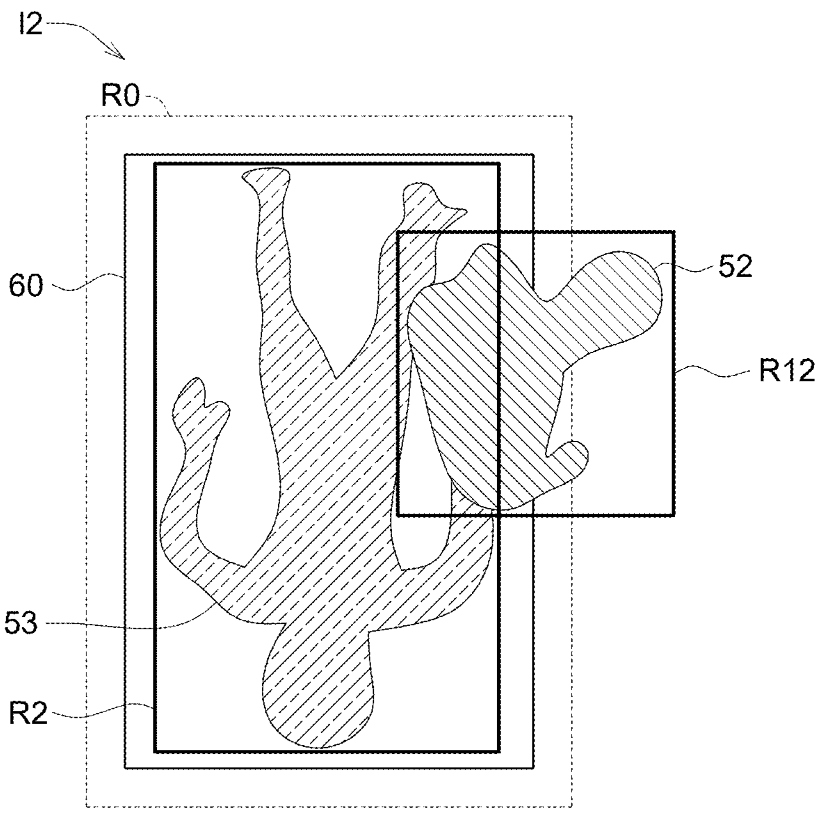
FIG. 3A is a schematic diagram of the second recognition device analyzing the second image.

On the other hand, the second recognition device 200 also performs similar operations. Please refer to FIG. 3A, which is a schematic diagram of the second recognition device 200 analyzing the second image I2. The second recognition device 200 defines a plurality of regions in the second image I2, including a region R0, a region R12, and a region R2. Wherein, the region R0 is defined taking the bed 60 as a reference object. Furthermore, the second recognition device 200 analyzes the target projection 52 and the target projection 53 from the second image I2. The object projection 52 is, for example, a projection of the target object 50 in a sitting posture, and the object projection 53 is, for example, a projection of the target object 50 in a lying posture. The second recognition device 200 defines a region R12 according to the target projection 52, and defines a region R2 according to the target projection 53.

Figure 3B:
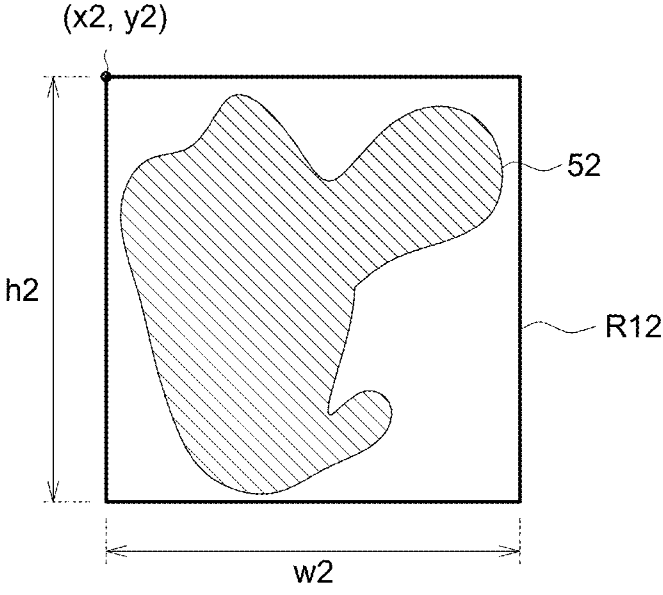
FIG. 3B is a schematic diagram of the region of the second image.

Next, please refer to FIG. 3B, which is a schematic diagram of the region R12 of the second image I2. The second recognition device 200 analyzes the region R12 to obtain a plurality of parameters, including the origin coordinate (x2, y2), the height h2 and the width w2 of the region R12. Furthermore, the second recognition result D2 includes the above parameters of the region R12, the second confidence B and the second posture category cls_2, as shown in equation (1-2):

$$D2 = [x2, y2, w2, h2, B, \text{cls\_2}] \tag{1-2}$$

Figure 4:
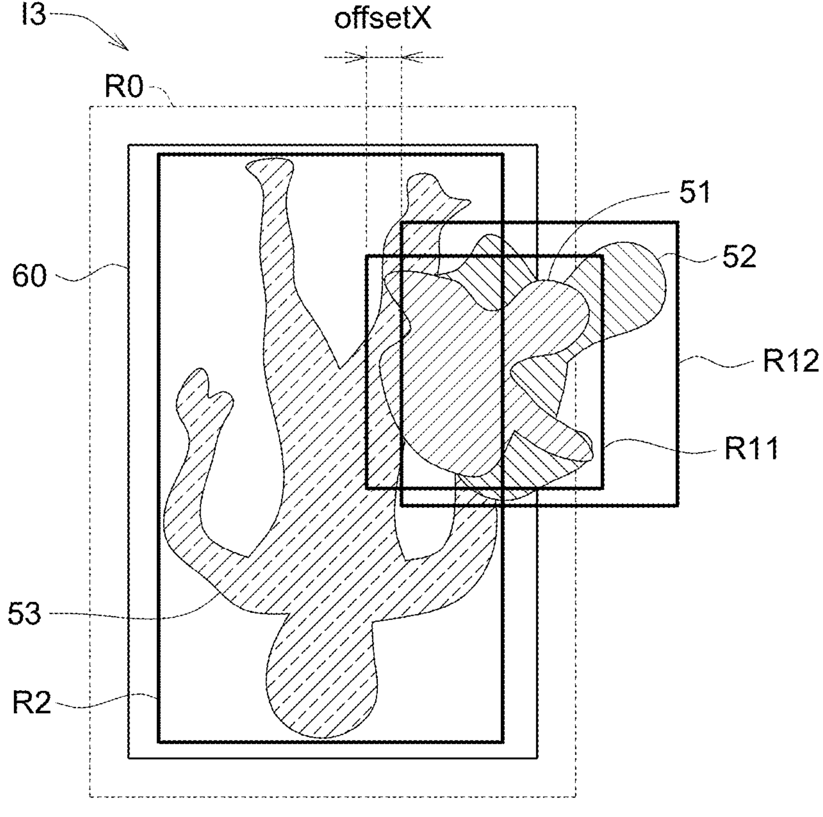
FIG. 4 is a schematic diagram of an exemplary superimposed image.

Then, the first processor 300 performs image superimposing according to the first image I1 and the second image I2, so as to generate a superimposed image I3. FIG. 4 is a schematic diagram of an exemplary superimposed image I3. The first processor 300 uses the region R0 corresponding to the bed 60 as a reference. Firstly, the first processor 300 aligns the region R0 of the first image I1 with the region R0 of the second image I2. Then, the first processor 300 superimposes the first image I1 with the second image I2 according to the aligned region R0, so as to obtain a superimposed image I3. Then, the first processor 300 performs a matching operation according to the superimposed image I3, the first recognition result D1 and the second recognition result D2, so as to obtain a plurality of matching results M(i).

Firstly, the first processor 300 performs a matching operation on the region R11 and the region R12 of the superimposed image I3, so as to obtain a matching result M(1) of the region R11 and the region R12. The matching result M(1) is composed of the following parameters: the matching degree ASSO between the region R11 and the region R12, the first recognition result D1 and the second recognition result D2. The matching result M(1) is shown in equation (2-1):

$$M(1) = \{(1, ASSO), D1, D2\} \tag{2-1}$$

In equation (2-1), the index "1" in the first column of the parameter "(1, ASSO)" represents the "first" matching result M(1). Furthermore, the matching degree ASSO in the second column represents the correlation degree between region R11 and region R12. In one example, according to the parameters of the regions R11 and R12 (including the origin coordinate (x1, y1), height h1 and width w1 of the region R11, and the origin coordinate (x2, y2), height h2 and width w2 of the region R12), the first processor 300 calculates the matching degree ASSO of the regions R11 and R12 according to a ratio of intersection-over-union (IOU), as shown in equation (2-2):

$$ASSO = \frac{(XR - XL) * (YB - YT)}{w2 * h2 + w1 * h1 - [(XR - XL) * (YB - YT)]} \tag{2-2}$$

In equation (2-2), the definition of parameter XR is as in equation (2-3), and the definition of parameter XL is as in equation (2-4). The offset amount offsetX represents a possible offset amount between the origin coordinate (x1, y1) of the region R11 and the origin coordinate (x2, y2) of the region R12. More specifically, the reference coordinate system of region R11 may have been originally aligned with the reference coordinate system of region R12. In this case, the origin coordinate (x1, y1) of region R11 coincide with the origin coordinate (x2, y2) of region R12, indicating that there is no offset between the reference coordinate system of region R11 and the reference coordinate system of region R12. The offset amount offsetX between the origin coordinate (x1, y1) of region R11 and the origin coordinate (x2, y2) of region R12 is "0". On the other hand, if the reference coordinate system of region R11 is not aligned with the reference coordinate system of region R12, then, when calculating the parameters XR and XL of the matching degree ASSO, the offset amount offsetX (whose value is not "0") between the origin coordinate (x1, y1) of region R11 and the origin coordinate (x2, y2) of region R12 must be taken into consideration.

$$XR = \min((x2 + w2 + offsetX), (x1 + w1)) \tag{2-3}$$

$$XL = \max((x2 + offsetX), x1) \tag{2-4}$$

Furthermore, in equation (2-2), the definition of parameter YB is as in equation (2-5), and the definition of parameter YT is as in equation (2-6):

$$YB = \min((y2 + h2), (y1 + h1)) \tag{2-5}$$

$$YT = \max(y2, y1) \tag{2-6}$$

In the superimposed image I3 of FIG. 4, the region R11 and the region R12 have a higher correlation degree. The first processor 300 calculates the matching degree ASSO between the region R11 and the region R12 according to equation (2-2), in which the calculated matching degree ASSO has a higher value, for example, equal to 0.91. Accordingly, the first processor 300 calculates a first matching result M(1) between the first image I1 and the second image I2, as shown in equation (2-7):

$$\begin{aligned} M(1) = \{&(1, 0.91), \\ &[x1, y1, w1, h1, A, \text{cls\_1}], \\ &[x2, y2, w2, h2, B, \text{cls\_2}]\} \end{aligned} \tag{2-7}$$

Next, the first processor 300 performs a matching operation according to the region R2 of the superimposed image I3 to obtain a second matching result M(2), as shown in equation (3):

$$M(2) = \{(2, ASSO), \text{NULL}, D2\} \tag{3}$$

In equation (3), the index "2" in the first column of the parameter "(2, ASSO)" represents the "second" matching result M(2). The region R2 of the superimposed image I3 is identified by the second recognition device 200 from the second image I2, and thus a second recognition result D2 corresponding to the region R2 can be generated.

However, the first recognition device 100 does not recognize a corresponding area in the first image I1, and therefore does not generate a first recognition result D1. And hence, the field corresponding to the first recognition result D1 in the second matching result M(2) is "NULL", indicating that the recognition result of the first recognition device 100 according to the first image I1 is a "null event".

Furthermore, the matching degree ASSO of the second column of the parameter "(2, ASSO)" in equation (3) represents the correlation degree between the region R2 and the possible corresponding region. Since the first recognition device 100 does not recognize a corresponding region (which may correspond to the region R2) in the first image I1, the matching degree ASSO of the region R2 is equal to 0.

Figure 5:
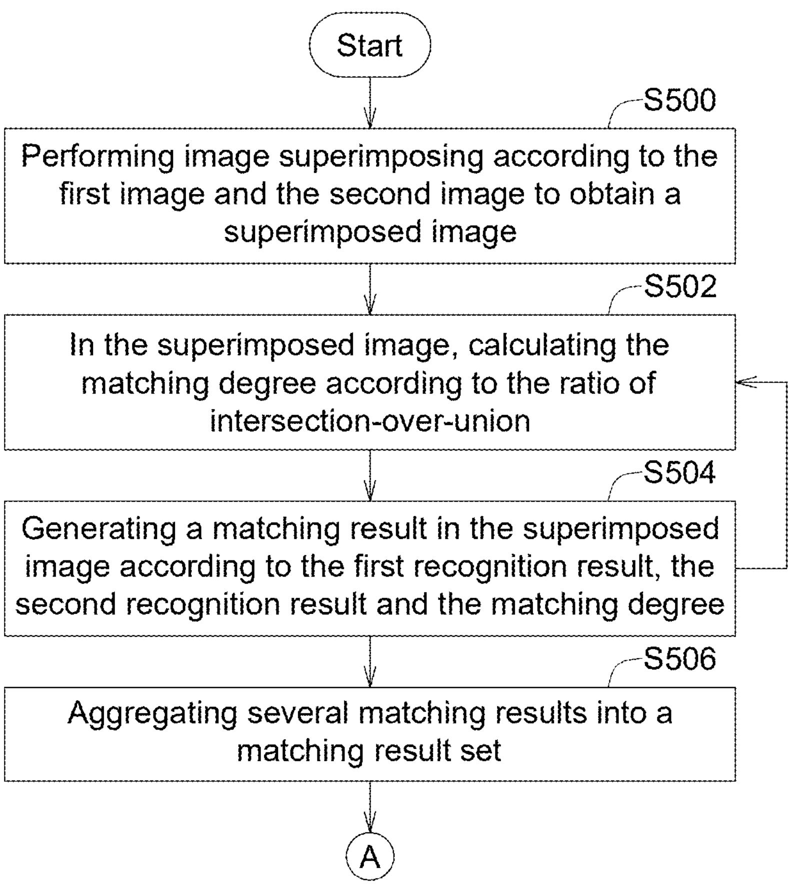
FIG. 5 is a flow diagram showing the first processor performing a matching operation according to the first recognition result, the second recognition result and the superimposed image.

FIG. 5 is a flow diagram showing the first processor 300 performing a matching operation according to the first recognition result D1, the second recognition result D2 and the superimposed image I3, which is a part of the safety event determining method of the present disclosure. The embodiments of FIGS. 2A, 2B, 3A, 3B and 4 described above can be represented by means of the flow diagram of FIG. 5. As shown in FIG. 5, firstly, step S500 is executed: the first processor 300 performs image superimposing according to the first image I1 and the second image I2, so as to obtain a superimposed image I3.

Next, step S502 is executed: in the superimposed image I3, the first processor 300 calculates the matching degree according to the ratio of intersection-over-union. The matching degree is the correlation degree between the region (e.g., the region R11 of FIG. 2A) corresponding to one of the target projections of the first image I1 (e.g., the target projection 51 of FIG. 2A) and the corresponding area (e.g., the region R12 of FIG. 2B) of the second image I2.

Next, step S504 is executed: according to the first recognition result D1 obtained by the first recognition device 100, the second recognition result D2 obtained by the second recognition device 200 and the matching degree obtained in step S502, the first processor 300 generates a first matching result M(1) in the superimposed image I3.

Then, steps S502 and S504 are repeatedly executed: with respect to other target projections of the first image I1 and/or the second image I2 (e.g., the target projection 53 of FIG. 3A), the first processor 300 generates other matching results in the superimposed image I3 (e.g., the second matching result M(2), the third matching result M(3), the fourth matching result M(4), etc.).

Next, step S506 is executed: aggregating the above-mentioned matching results M(1), M(2), M(3), M(4), etc. into the matching result set {M(i)}.

Figure 6:
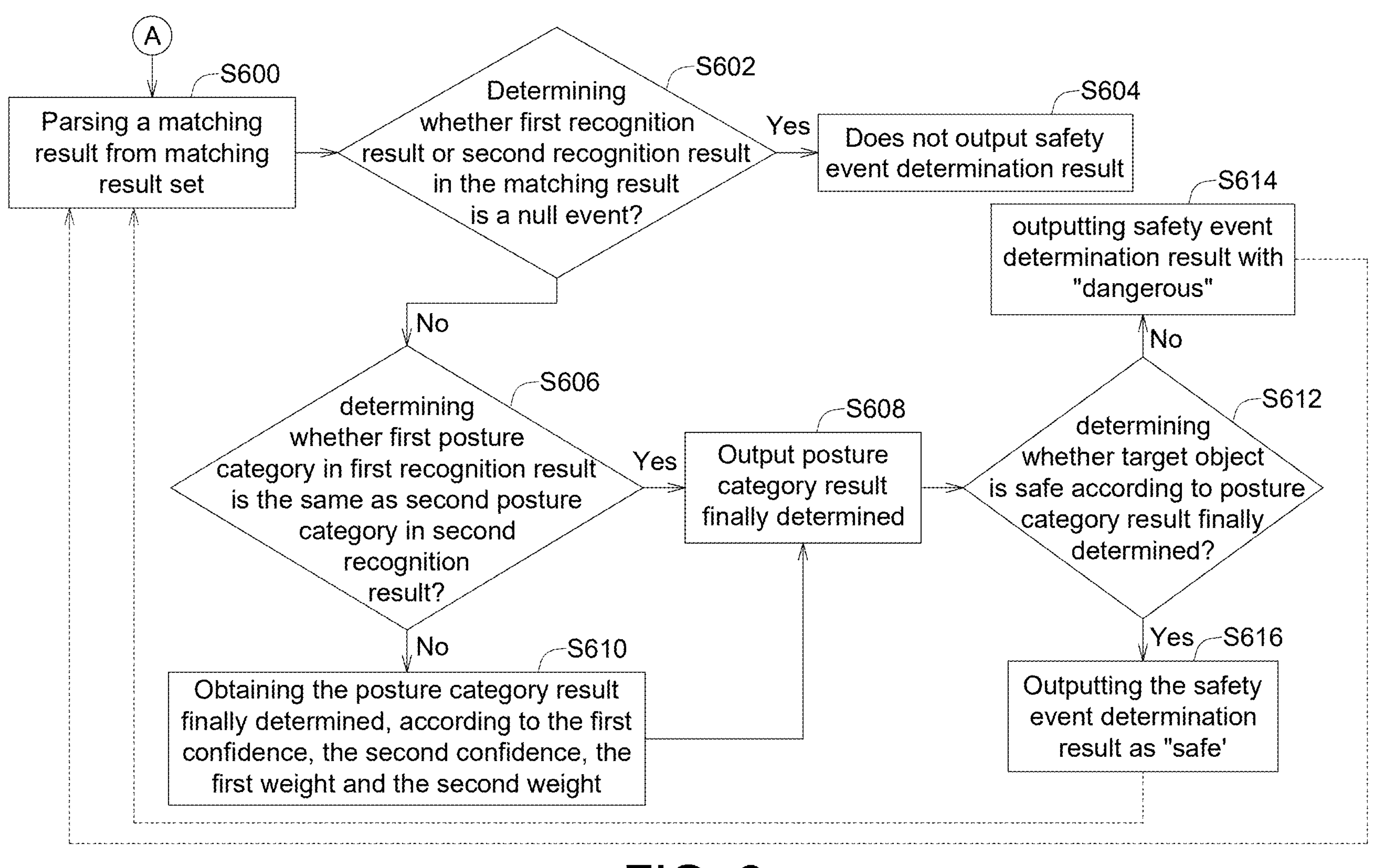
FIG. 6 is a flow diagram showing the second processor analyzing and processing the matching result set to obtain the posture category result and the safety event determination result.

FIG. 6 is a flow diagram showing the second processor 400 analyzing and processing the matching result set {M(i)} to obtain the posture category result CLS and the safety event determination result S, which is a part of the safety event determining method of the present disclosure. As shown in FIG. 6, firstly, step S600 is executed: the second processor 400 parses the first matching result M(1) from the matching result set {M(i)}.

Next, step S602 is executed: the second processor 400 determines whether the first recognition result D1 or the second recognition result D2 in the matching result M(1) is a null event. If the determination result of step S602 is "Yes", it means that the currently analyzed regions of the first image I1 and the second image I2 do not match, therefore, the second processor 400 cannot determine the posture category result CLS and cannot determine the safety event determination result S. And hence, step S604 is then executed: the second processor 400 does not output the safety event determination result S to the alarm device 500.

If the determination result of step S602 is "No", indicating that the matching result M(1) comprises the first recognition result D1 and the second recognition result D2, then step S606 is executed: determining whether the first posture category cls_1 in the first recognition result D1 is the same as the second posture category cls_2 in the second recognition result D2. If the determination result of step S606 is "Yes", the second processor 400 takes the first posture category cls_1 (or the second posture category cls_2) as the posture category result CLS, and the second processor 400 outputs the posture category result CLS to the alarm device 500. For example, in the embodiments of FIGS. 2B and 3B, in the matching result M(1) of the regions R11 and R12, both the first posture category cls_1 and the second posture category cls_2 are "sitting posture", and the second processor 400 determines the posture category result CLS to be "sitting posture".

If the determination result of step S606 is "No", it means that the second processor 400 cannot determine to take the first posture category cls_1 (or the second posture category cls_2) as the posture category result CLS. Therefore, step S610 is then executed: the second processor 400 performs calculation according to the first confidence A, the second confidence B, the first weight WE1 and the second weight WE2, so as to obtain the posture category result CLS which is finally determined. In this embodiment, the second processor 400 calculates the first product PD1 of the first confidence A and the first weight WE1, and calculates the second product PD2 of the second confidence B and the second weight WE2, as shown in equation (4-1) and equation (4-2):

$$PD1 = A * WE1 \tag{4-1}$$

$$PD2 = B * WE2 \tag{4-2}$$

Furthermore, the second processor 400 compares the first product PD1 with the second product PD2, so as to obtain a maximum value of the first product PD1 and the second product PD2, and thereby obtains the posture category result CLS which is finally determined. Please refer to equation (4-3), the indicator T is the maximum value of the first product PD1 and the second product PD2, and the indicator T points to the first posture category cls_1 or the second posture category cls_2.

$$T = \max\{PD1, PD2\} \tag{4-3}$$

If the first product PD1 is greater than the second product PD2, the indicator T points to the first posture category cls_1, and the second processor 400 uses the first posture category cls_1 as the posture category result CLS which is finally determined. On the contrary, if the first product PD1 is smaller than the second product PD2, the indicator T points to the second posture category cls_2, and the second processor 400 uses the second posture category cls_2 as the posture category result CLS which is finally determined.

Step S608 is executed after the determination result of step S606 is "Yes" or after step S610. In step S608, the second processor 400 outputs the determined posture category result CLS to the alarm device 500.

Next, step S612 is executed after step S608. In step S612, the second processor 400 determines whether the target object 50 is safe according to the posture category result CLS which is finally determined, and generates a safety event determination result S accordingly. If the determination result of step S612 is "Yes", it means that the target object 50 is determined to be safe. For example, in the matching result M(1), the first posture category cls_1 is the same as the second posture category cls_2, which are both the "sitting posture", so the posture category result CLS is the "sitting posture". The second processor 400 may analyze that the region R11 of the target projection 51 and the region R12 of the target projection 52 substantially fall within the region R0 corresponding to the bed 60. Therefore, the second processor 400 determines that the target object 50 is sitting on the bed 60, and determines that the target object 50 is safe.

Then, step S616 is executed after the determination result of step S612 is "Yes". In step S616, the second processor 400 outputs the safety event determination result S as "safe", and transmits the safety event determination result S to the alarm device 500 The alarm device 500 is informed that the safety event determination result S with "safe", and the alarm device 500 does not generate the alarm signal WR.

If the determination result of step S612 is "No", indicating that the target object 50 is determined to be dangerous, then step S614 is executed: the second processor 400 outputs the safety event determination result S with "dangerous", which is transmitted to the alarm device 500. In response to the safety event determination result S with "dangerous", the alarm device 500 generates an alarm signal WR.

Next, step S600 is repeatedly executed: the second processor 400 parses the matching result set {M(i)} to obtain a second matching result M(2). The subsequent steps S602 to S616 are executed according to the second matching result M(2). For example, for the region R2 in the superimposed image I3, there is no corresponding recognition result of the first image I1, so the field of the first recognition result D1 of the matching result M(2) is a null event (such as "NULL" shown in equation (3)). Therefore, in the subsequent step S602 for the matching result M(2), the first recognition result D1 of the matching result M(2) is a null event, and the second processor 400 cannot determine the posture category result CLS and cannot determine the safety event determination result S. Therefore, step S604 is then executed: the second processor 400 does not output the safety event determination result S to the alarm device 500.

Figure 7:
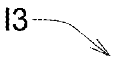
FIG. 7 is a schematic diagram of a superimposed image according to another embodiment.
Figure 7:
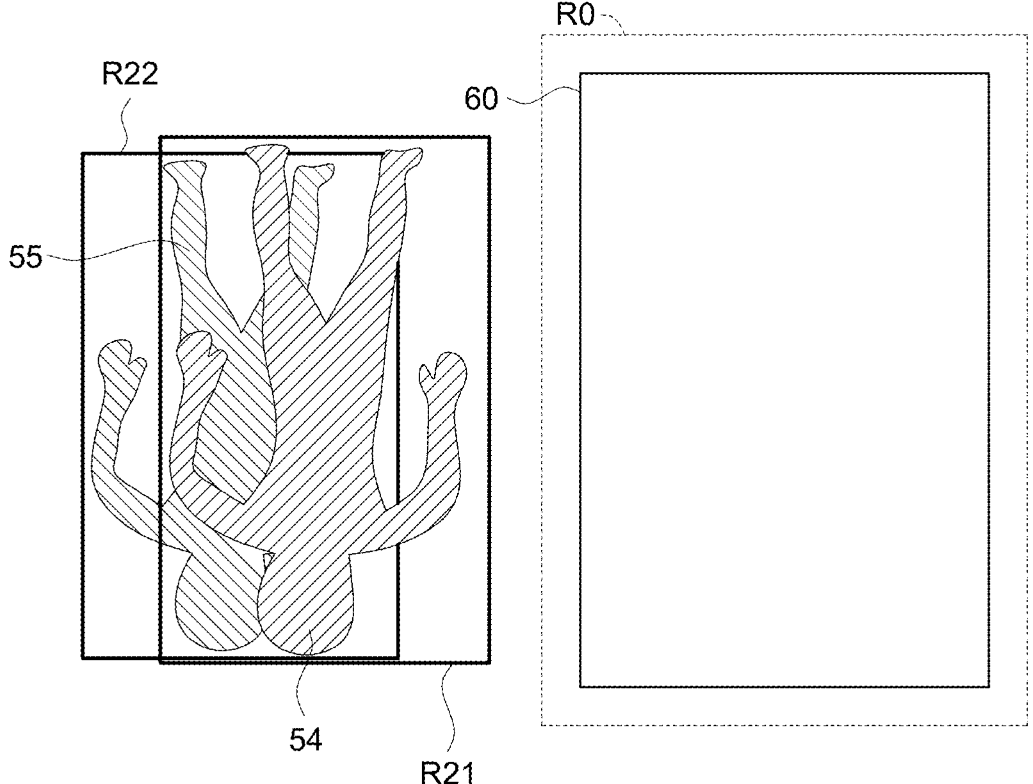

FIG. 7 is a schematic diagram of a superimposed image I3 according to another embodiment. As shown in FIG. 7, in the superimposed image I3, the target projection 54 is, for example, a projection of the target object 50 in a lying posture. The first recognition device 100 defines a region R21 according to the target projection 54. On the other hand, the object projection 55 is also a projection of the target object 50 in a lying posture. The second recognition device 200 defines a region R22 according to the target projection 55.

The first processor 300 performs a matching operation on the region R21 and the region R22 of the superimposed image I3, so as to obtain a matching degree ASSO between the region R21 and the region R22. The region R21 and the region R22 have a higher correlation degree, so the matching degree ASSO thereof two has a higher value, for example, equal to 0.85. The matching result M(1) of region R21 and region R22 is shown in equation (5-1):

$$M(1)=\{(1,0.85),D1,D2\} \tag{5-1}$$

More particularly, the first posture category cls_1 of the first recognition result D1 of the matching result M(1) is "lying posture", and the second posture category cls_2 of the second recognition result D2 is also "lying posture". That is, the first posture category cls_1 is the same as the second posture category cls_2, and the posture category result CLS can be determined as the "lying posture".

Furthermore, the second processor 400 analyzes that, the regions R21 and R22 of the superimposed image I3 are outside the region R0 of the bed 60, indicating that the target object 50 is lying outside the bed 60. Therefore, the second processor 400 determines that, the target object 50 is not lying on the bed, but may have fallen beside the bed 60. The second processor 400 outputs the posture category result CLS as the "lying posture" and outputs the safety event determination result S as "dangerous".

Figure 8:
FIG. 8 is a schematic diagram of a superimposed image according to yet another embodiment.
Figure 8:
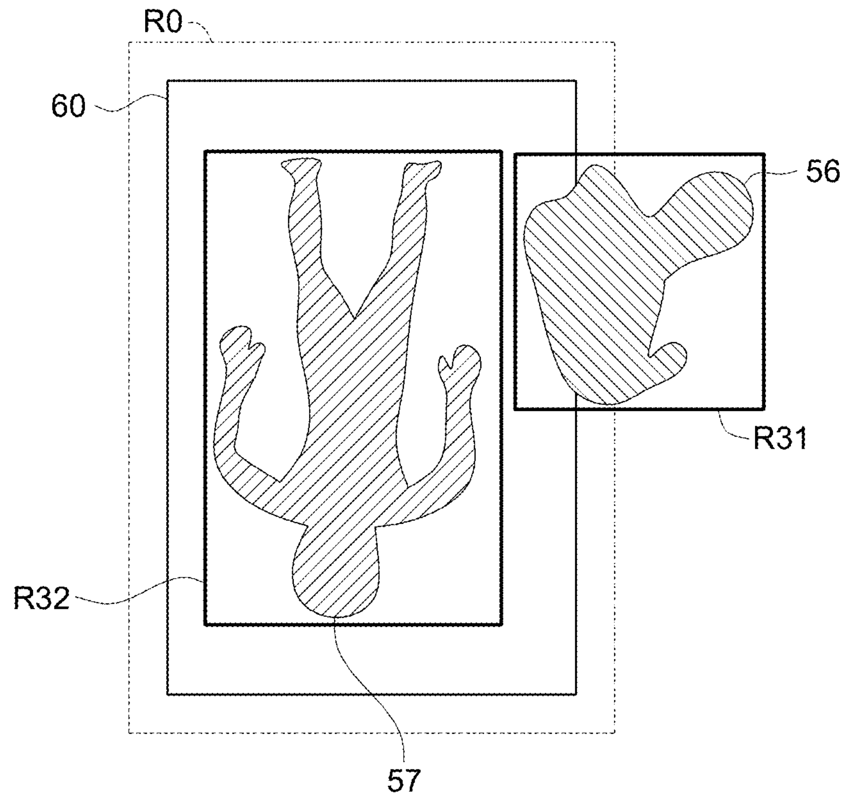

FIG. 8 is a schematic diagram of a superimposed image I3 according to yet another embodiment. As shown in FIG. 8, in the superimposed image I3, the first recognition device 100 obtains the target projection 56 according to the time-of-flight measurement, and defines a region R31 according to the target projection 56. The object projection 56 is, for example, a projection for sitting posture of the object 50. The first posture category cls_1 of the first recognition result D1 is "sitting posture".

On the other hand, the second recognition device 200 obtains the target projection 57 according to infrared imaging, and defines the region R32 according to the target projection 57. The object projection 57 is, for example, a projection of the object 50 in a lying posture. The second posture category cls_2 of the second recognition result D2 is the "lying posture". Since the target projection 57 is obtained according to infrared imaging, the target projection 57 may be an "afterimage" of the target object 50 in the previous period, rather than the posture of the target object 50 in the current period.

The first processor 300 calculates the matching degree ASSO between the region R31 and the region R32. The region R31 and the region R32 have a lower correlation degree, so the matching degree ASSO thereof has a lower value, for example, equal to 0.05.

Since the first posture category cls_1 is the "sitting posture", which is different from the second posture category cls_2 of the "lying posture", the second processor 400 is temporarily unable to determine whether the posture category result CLS is the "sitting posture" or the "lying posture". Therefore, the second processor 400 must further obtain the posture category result CLS which is finally determined, according to the first confidence A, the second confidence B, the first weight WE1 and the second weight WE2.

If the posture category result CLS is determined to be the "sitting posture", the second processor 400 analyzes whether the region R31 of the superimposed image I3 is within the range of the region R0 of the bed 60. If the region R31 is within the range of the region R0 of the bed 60, it means that the object 50 sits on the bed 60, not falls down. Therefore, the second processor 400 outputs the posture category result CLS as the "sitting posture" and outputs the safety event determination result S as "safe".

In summary, in the present disclosure, the safety event determining system 1000 and the safety event determining method executed thereby, may perform dual-mode determination according to two image-forming mechanisms, which can take into account both the advantages of the depth image monitoring and the thermal image monitoring. Furthermore, by calculating the matching degree and comparing the posture categories, it may avoid erroneous determination for the depth image monitoring or the thermal image monitoring. And hence, the accuracy for determination of safety events may be enhanced.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A safety event determining system, for determining whether a target object is safe, and the safety event determining system comprising:
- a first recognition device, for recognizing a posture of the target object according to a first image, so as to generate a first recognition result, wherein the first recognition result is associated with a first confidence;
- a second recognition device, for recognizing the posture of the target object according to a second image, so as to generate a second recognition result, wherein the second recognition result is associated with a second confidence, and the second image is heterogeneous with respect to the first image;
- a first processor, configured to superimpose the first image and the second image to generate a superimposed image, and perform a matching operation according to the first recognition result, the second recognition result and the superimposed image to obtain a matching result set, wherein the matching result set comprises a plurality of matching results; and
- a second processor, configured to analyze each of the matching results to obtain a posture category result and a safety event determination result.

2. The safety event determining system of claim 1, wherein the first image is generated by a first image capturing device, the first image capturing device is a time-of-flight (ToF) camera device, and the first image is a depth image of the target object.

3. The safety event determining system of claim 1, wherein the second image is generated by a second image capturing device, the second image capturing device is an infrared camera device, and the second image is a thermal image of the target object.

4. The safety event determining system of claim 1, wherein each of the matching results comprises a matching degree, the first recognition result and the second recognition result.

5. The safety event determining system of claim 4, wherein the matching degree is a correlation degree between a first region projected by a first target object in the first image and a second region projected by a second target object in the second image.

6. The safety event determining system of claim 5, wherein the first region has a plurality of first parameters, and the second region has a plurality of second parameters, and the first processor calculates the matching degree according to the first parameters and the second parameters based on an intersection-over-union (IoU) ratio.

7. The safety event determining system of claim 6, wherein the first parameters comprise a first origin coordinate, a first height and a first width of the first region, and the second parameters comprise a second origin coordinate, a second height and a second width of the second region.

8. The safety event determining system of claim 6, wherein the first recognition result comprises the first parameters, the first confidence and a first posture category, and the second recognition result comprises the second parameters, the second confidence and a second posture category.

9. The safety event determining system of claim 8, when the first posture category is the same as the second posture category, the second processor takes the first posture category or the second posture category as the posture category result.

10. The safety event determining system of claim 8, wherein the second processor calculates a first product of the first confidence and a first weight, and calculates a second product of the second confidence and a second weight, and when the first posture category is different from the second posture category, the second processor determines the posture category result according to the relationship of magnitudes between the first product and the second product.

11. A safety event determining method, for determining whether a target object is safe, and the safety event determining method comprising:

recognizing a posture of the target object according to a first image by a first recognition device, so as to generate a first recognition result, wherein the first recognition result is associated with a first confidence;

recognizing the posture of the target object according to a second image by a second recognition device, so as to generate a second recognition result, wherein the second recognition result is associated with a second confidence, and the second image is heterogeneous with respect to the first image;

superimposing the first image and the second image to generate a superimposed image, and performing a matching operation according to the first recognition result, the second recognition result and the superimposed image to obtain a matching result set, by a first processor, wherein the matching result set comprises a plurality of matching results; and analyzing each of the matching results to obtain a posture category result and a safety event determination result, by a second processor.

12. The safety event determining method of claim 11, further comprising:

generating the first image by a first image capturing device, wherein, the first image capturing device is a time-of-flight (ToF) camera device, and the first image is a depth image of the target object.

13. The safety event determining method of claim 11 further comprising:

generating the second image by a second image capturing device, wherein, the second image capturing device is an infrared camera device, and the second image is a thermal image of the target object.

14. The safety event determining method of claim 11, wherein each of the matching results comprises a matching degree, the first recognition result and the second recognition result.

15. The safety event determining method of claim 14, wherein the matching degree is a correlation degree between a first region projected by a first target object in the first image and a second region projected by a second target object in the second image.

16. The safety event determining method of claim 15, wherein the first region has a plurality of first parameters, and the second region has a plurality of second parameters, and the safety event determining method further comprising:

calculating the matching degree by the first processor according to the first parameters and the second parameters based on an intersection-over-union (IoU) ratio.

17. The safety event determining method of claim 16, wherein the first parameters comprise a first origin coordinate, a first height and a first width of the first region, and the second parameters comprise a second origin coordinate, a second height and a second width of the second region.

18. The safety event determining method of claim 16, wherein the first recognition result comprises the first parameters, the first confidence and a first posture category, and the second recognition result comprises the second parameters, the second confidence and a second posture category.

19. The safety event determining method of claim 18, further comprising:

when the first posture category is the same as the second posture category, the second processor determines the posture category result as either the first posture category or the second posture category.

20. The safety event determining method of claim 18, wherein the second processor is configured to:

calculate a first product of the first confidence and a first weight;

calculate a second product of the second confidence and a second weight; and when the first posture category is different from the second posture category, determine the posture category result according to a comparison between the first and second products.

* * * * *